US006434918B1

(12) United States Patent
Csonka et al.

(10) Patent No.: US 6,434,918 B1
(45) Date of Patent: Aug. 20, 2002

(54) ENCLOSED LAWNMOWER HAVING AIR FLOW CONTROL

(75) Inventors: Bela I. Csonka, Phoenix, AZ (US); Jean-Claude Danthois, Mazingarbe (FR)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 09/359,154

(22) Filed: Jul. 22, 1999

(Under 37 CFR 1.47)

Related U.S. Application Data

(60) Provisional application No. 60/093,941, filed on Jul. 23, 1998.

(51) Int. Cl.[7] ............................................... A01D 87/10
(52) U.S. Cl. ........................................ 56/13.4; 56/12.8
(58) Field of Search ................................. 56/16.7, 13.4, 56/16.9, 12.8, 202, DIG. 5; 123/198 E

(56) References Cited

U.S. PATENT DOCUMENTS

| 2,882,668 | A |   | 4/1959  | Murillo |            |
|-----------|---|---|---------|---------|------------|
| 3,398,514 | A | * | 8/1968  | Nolan   | 56/16.9    |
| 3,729,908 | A | * | 5/1973  | Miner   | 56/16.7    |
| 3,757,503 | A | * | 9/1973  | Soldavini | 56/202   |
| 4,051,648 | A |   | 10/1977 | Uhlinger et al. |    |
| D249,690  | S | * | 9/1978  | Thomas  | D15/14     |
| 4,158,280 | A | * | 6/1979  | Thomas et al. | 56/202 |
| 4,194,345 | A | * | 3/1980  | Pioch et al. | 56/17.5 |
| 4,244,164 | A | * | 1/1981  | Szymanis | 56/202    |
| 4,245,455 | A | * | 1/1981  | Martin  | 56/12.8    |
| 4,361,001 | A | * | 11/1982 | Almond et al. | 56/12.8 |
| 4,881,362 | A | * | 11/1989 | Parker et al. | 56/202 |
| 4,944,142 | A | * | 7/1990  | Sueshige et al. | 56/320.1 |
| 4,974,403 | A | * | 12/1990 | Fukui et al. | 56/202 |
| 5,060,460 | A | * | 10/1991 | Dunn    | 56/12.8    |
| D332,270  | S | * | 1/1993  | Hefty   | D15/14     |
| D333,309  | S | * | 2/1993  | Hess et al. | D15/14 |
| 5,197,426 | A | * | 3/1993  | Frangesch et al. | 123/198 E |
| 5,240,188 | A | * | 8/1993  | Whitmire | 241/29    |
| 5,435,118 | A | * | 7/1995  | Cobile  | 56/13.4    |
| D381,665  | S | * | 7/1997  | Hinklin et al. | D15/14 |
| D396,476  | S | * | 7/1998  | Shimizu | D15/1      |

FOREIGN PATENT DOCUMENTS

| EP | 0 031 158     | 7/1981  |
|----|---------------|---------|
| EP | 0 738 463 A1  | 10/1996 |
| FR | 1342455       | 11/1962 |
| FR | 2243634       | 9/1973  |
| FR | 2399200       | 8/1977  |
| GB | 2175483 A     | 12/1986 |
| GB | 2246939       | 2/1992  |

* cited by examiner

Primary Examiner—Robert E. Pezzuto
Assistant Examiner—Árpád Fábián Kovács

(57) ABSTRACT

A lawnmower has a mower deck and an engine supported on the mower deck. A dome shaped cover is pivotally connected on the mower deck and can be moved between a position over and enclosing the engine and a second position exposing the engine. A cutting blade is located below the mower deck and is connected to and driven by the engine. The dome shaped cover is provided with vents and defines a space between its lower edge and the mower deck so that air can enter the cover through the vents and the defined space. A fan is connected to and driven by said engine for producing, in cooperation with said vents and the defined space, air flow into and through the dome shaped cover and over the engine. The fan is constructed and arranged so that it discharges the air flow it is providing into the grass cutting discharge stream of the mower.

8 Claims, 3 Drawing Sheets

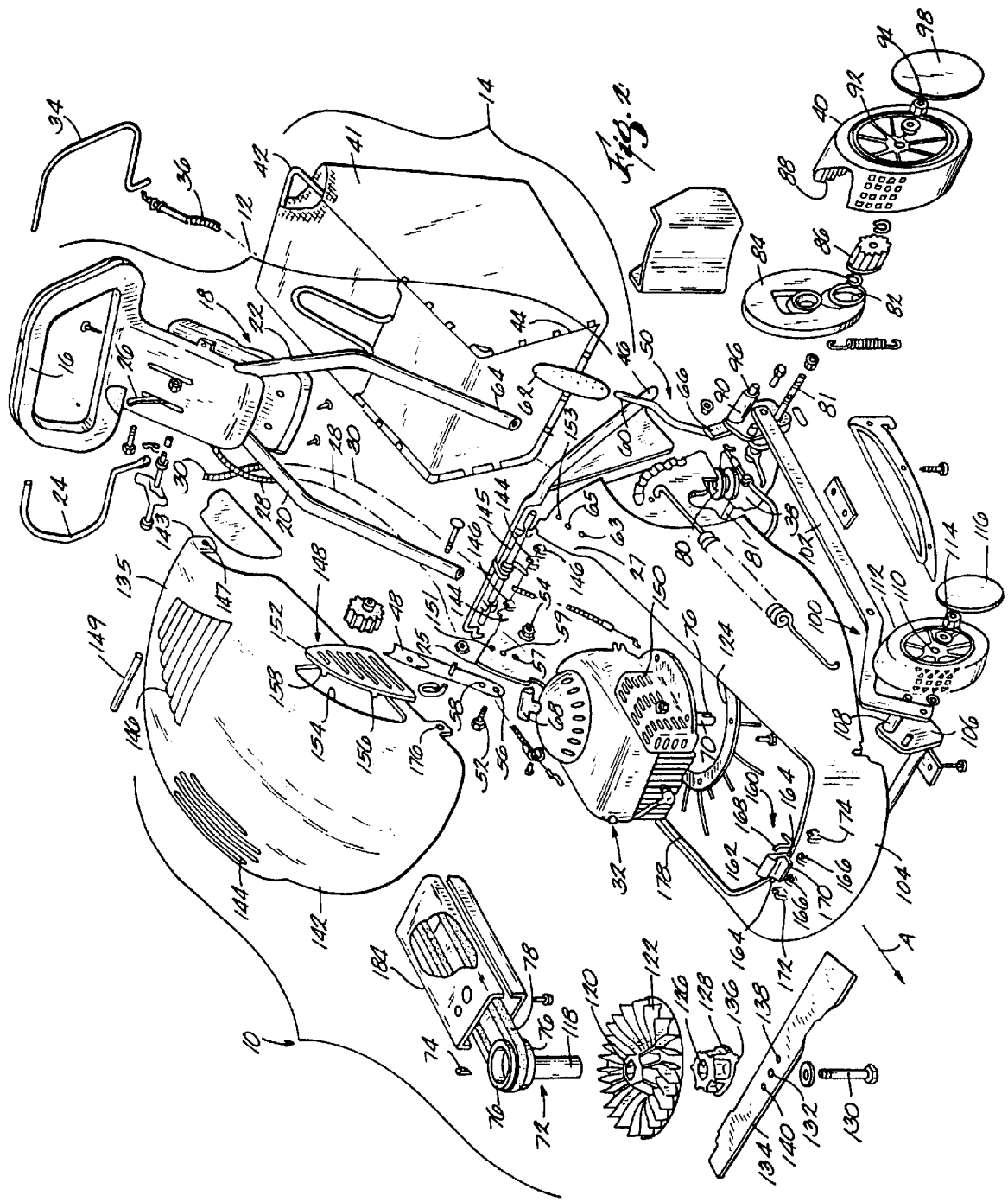

US 6,434,918 B1

ENCLOSED LAWNMOWER HAVING AIR FLOW CONTROL

RELATED APPLICATION

This application claims priority from prior filed provisional application Serial No. 60/093,941, filed Jul. 23, 1998.

FIELD OF THE INVENTION

This invention relates to lawnmowers.

BACKGROUND OF THE INVENTION

Conventional practice is to provide a lawnmower having an open construction. That is, the engine whether it is electric or internal combustion, is exposed to the atmosphere. Generally, this has been considered a fairly acceptable arrangement even though the noise level generated during operation of the lawnmower is a persistent problem. Also, with the engine and the deck area surrounding the engine exposed to the ambient conditions during the mowing operation, cleanliness and thus the appearance of the lawnmower can be a further problem.

SUMMARY OF THE INVENTION

Among the objects of this invention are to reduce the noise level of an operating lawnmower, and to do so without detracting from the overall operating performance of the lawnmower.

For the achievement of those and other objects, this invention proposes to provide an enclosure over the lawnmower engine and the deck area immediately adjacent the lawnmower. The enclosure is provided with strategically placed air intakes and a fan for influencing the flow of air into the enclosure, and over the engine. In addition, the fan is located and associated with appropriate venting through and around the enclosure such that the airflow created through the enclosure is over the engine and is also exhausted into the grass cutting discharge stream to enhance the flow of cut grass into the lawnmower bag.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 2 is an exploded view of the lawnmower of FIG. 1 with an internal combustion engine;

DESCRIPTION OF THE PREFERRED EMBODIMENT

Figure 1:
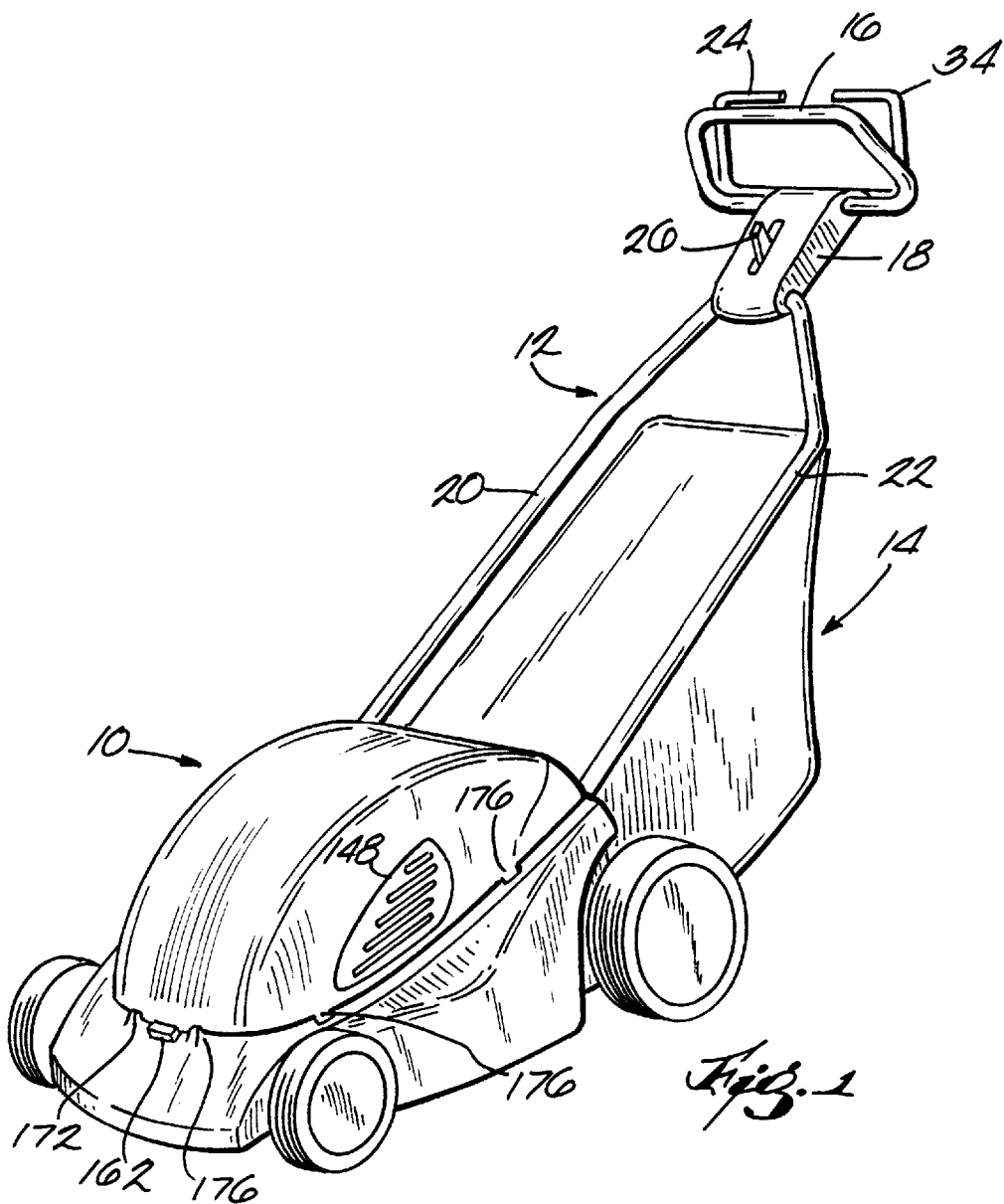
FIG. 1 is a perspective of a lawnmower embodying this invention.

With reference to FIG. 1 of the drawing, the mower includes a mower blade section 10, a handle assembly 12 and a rear bag 14.

The handle assembly includes a grip 16, a control console 18 extending from the grip, and bars 20 and 22 extending from the control console to the mower blade section.

The control console includes a conventional operator presence throttle control 24 and a start control 26. The operator presence control and start control are connected by mechanical cables 28 and 30 to the mower engine 32 (FIG. 2).

Also associated with the handle is an operator presence type brake actuator 34 which is connected by a mechanical cable 36 to a brake and transmission assembly 38.

In use, the operator presence throttle control 24 must be urged against the grip 16 to allow the engine to run and power the cutter blade. Similarly, in order to push the lawnmower, the operator presence brake actuator 34 has to be urged against the grip to release the brake on the drive shaft for the wheels of the mower. One wheel 40 is illustrated in FIG. 2. A similar wheel is on the opposite side of the mower blade section but has not been shown in FIG. 2.

The rear bag includes canvas or other suitable fabric outer enclosure 41 which fits over a wire-form frame 42 to provide a generally box shaped grass cutting receiver. The grass cutting receiver is attached at its front end 44 to a bag receiving assembly 46 attached to the mower blade section. The front end 44 of bag 14 is generally open. An opening (not shown) is provided in bag receiving section 46 and communicates with the open end of bag 14 to discharge grass cuttings into the bag interior.

Bag receiving assembly 46 is attached to the mower deck by means of spring loaded rod 145 which snaps into U-shaped openings in ears 144 and 146. The ears 144 and 146 are attached to the mower deck. Two sets of the ears are provided as shown in the drawings.

The ends of bars 20 and 22 are attached to the mower blade section by brackets 48 and 50 which are in turn attached to the mower deck assembly at projections 25 and 27 on the mower deck. Bracket 48 is attached by threading nut and bolt combinations 52, 54 through selected openings 56 or 58 and 57 or 59. On the opposite sides of the mower deck, the bar 22 is attached to frame member 60 by a suitable bolt extending through bracket 62 and opening 64 in the bottom of bar 22 and openings 63 or 65. Frame member 60 is attached to the mower frame assembly at mounting bracket 66 and its upper end is clamped between the end of the bar 22 and bracket 62.

Turning now to the mower blade section, the engine 32 is a conventional internal combustion two cycle engine, although it can be a four cycle or an electric engine if desired.

The engine includes a conventional pull start 68 and an output shaft 70. The output shaft extends into a drive adapter 72 and has a key and key way connection with the drive adapter through keys 74 and key way 76. In this manner, rotary motion of output shaft 70 is transmitted to the drive adapter.

The drive adapter includes a pulley section 76 at its upper end which is connected by a conventional drive belt 78 to a pulley 80 mounted on the brake and transmission assembly 38. In this manner, rotary motion of drive adapter 72 is transmitted to the transmission assembly 38 and through the transmission assembly to a drive shaft 81 which is connected to wheel 40.

The drive shaft 81 also extends outwardly of the opposite side of the transmission 38 to an opposite drive wheel on the other side of the mower, the connection of that wheel to the drive shaft is identical to that of wheel 40 and therefore has not been illustrated. Drive shaft 81 extends through opening 82 in cover 84 which is attached to bracket 66 and carries a drive gear 86. Drive gear 86 meshes with internal teeth 88 provided on the inner periphery of wheel 40 to rotate the wheel. The wheel 40 is supported for rotation on stub shaft 90 which extends through opening 92 in the wheel and is attached to the wheel by nut 94 which screws onto a threaded end 96 of stub shaft 90. Protective cover 98 fits onto wheel 40 to enclose the connection to the wheel.

A front wheel assembly 100 is attached to the front of the mower blade section. This attachment is made by means of an elongated arm 102 which is attached to bracket 66 and to the front of the deck assembly 104 of the mower blade section. Arm 102 is attached to bracket 106 which is in turn attached to the deck. Bracket 106 includes a stub shaft 108 which extends through opening 110 in wheel 112 and is anchored by bolt 114 which screws onto a threaded end of stub shaft 108 to anchor wheel 112. The wheel 112 is free wheeling on the stub shaft 108. Again, a protective cover 116 fits over the outside of the wheel 100. A similar wheel assembly is provide on the opposite side of the mower but is not shown.

Returning now to the engine and the elements driven by the engine, the drive adapter 72 has an extension 118 which is hexagonal in cross section. The hexagonal extensions extends into a central opening 120 in fan 122. opening 120 is hex shaped and complements the shape of extension 118. In that manner, rotational motion of drive adapter 72 is transmitted to the fan 122. The fan is located beneath opening 124 in the mower deck 104.

Hexagonal extension 118 extends through the fan 122 and into an opening 126 in hub 128. opening 126 is hexagonally shaped and is complementary to the cross section of extension 118 so that rotary motion is also imparted to hub 128. A bolt 130 extends through a central opening 132 in cutter blade 134. The hexagonally shaped opening 126 in hub 128 is a through hole so that bolt 130 extends into the hub 128 and threads into a threaded opening in the bottom of extension 118. The hub 128 includes two shear pins 136 which fit into openings 138 and 140. Only one shear pin 136 is illustrated in the drawings but the shear pins are diametrically opposed so that they can register with openings 138 and 140. This establishes a drive connection with the cutter blade and one which can be interrupted. That is the drive connection is interrupted by shearing shear pins 136 if the cutter blades meet an obstacle in the mowing operation.

A dome shaped enclosure 142 fits over the mower deck 104 to enclose the engine 32.

The dome shaped enclosure 142 is pivotally supported at the rear of the mower deck 104. More specifically, a tab 143 is provided in one rear corner of the enclosure 142. The tab is generally perpendicular to the rear edge 145 of the enclosure, and has an aperture 147 therein. An identical apertured tab (not shown) is provided on the other rear corner of the enclosure 142. A round pin 149 extends through the aperture 147 and the identical aperture of the tab on the opposite corner. The pin also extends into openings 151 and 153 on opposite sides of the mower deck. The pin is held captive in openings 151 and 153 when handle bars 20 and 22 are attached to the projections 25 and 27 as previously described.

With this construction, the dome shaped enclosure 142 can be pivoted upwardly to expose the engine, for example to expose pull handle 68 to start the engine.

Fan 122 as described above is positioned at opening 124 but on the underside of the mower deck 104 and thus below engine 32, which is positioned on the upperside of the mower deck. With that orientation, the fan draws air downwardly over the engine through opening 124 and beneath the mower deck 104. This provides a steady stream of cooling air over the engine and, as will be described more completely hereinafter, also provides an additional airstream to enhance the flow of grass cuttings into the bag 40.

To cooperate in providing the airflow over the engine under the influence of fan 122, the dome shaped enclosure 142 is provided with a side vent 144 and a rear vent 146. The side and rear orientation is with respect to the forward path of travel of the mower depicted by arrow A. These vents are merely elongated slots cut or molded into and through the surface of the dome shaped enclosure to provide for the passage of air.

A third vent 148 is provided on the domed enclosure 142 on the side opposite to vent 144. This vent will be adjacent to the exhaust port 150 of engine 32. Thus, there will be hot, engine discharge air in that area and the vent 148 is provided to allow for effective escape of that hot air to the ambient atmosphere. Since this particular vent will be exposed to relatively hot gases and airflow which would have a tendency to discolor the housing, it is formed by a removable cover 152 which snaps into a complementary opening 154 in the domed enclosure. The snap fitting is provided by L-shaped fingers 156 and 158, which fit behind the upper edge of opening 154 and cooperate with a similarly shaped spring finger (not shown) at the bottom of cover 152 which, in turn, engages the lower edge of opening 154 to detachably hold the cover 152 in opening 154. The cover can then be replaced by a new cover when it becomes discolored.

Figure 3:
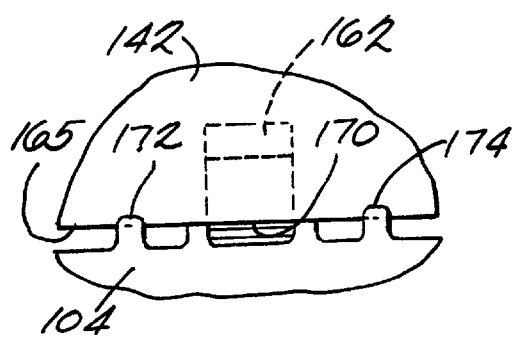
FIG. 3 is a partial front view of the latch area of the enclosure illustrating part of the air circulation configuration.
Figure 4:
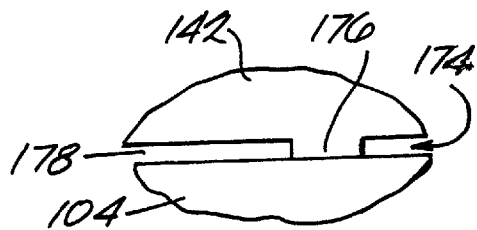
FIG. 4 is a view of a portion of one side of the enclosure and the mower deck illustrating yet another aspect of the air circulation arrangement.

With reference to FIG. 3; as well as FIG. 2, a latch mechanism 160 is provided at the front of the mower. This latch mechanism includes a latch 162 having oppositely extending pins 164. Pins 164 fit into complementary openings in ears 166. The ears are an integral part of deck 104. A spring 168 is also anchored to the mower deck housing and engages the rear of latch 162 biasing it in a counterclockwise direction, as viewed in the drawings, to engage with a shelf (not shown) on the interior of the front of the domed enclosure to hold the front of the dome enclosure down. The dome enclosure is released for pivotal movement to expose the engine by manually grasping the edge 170 and moving the latch in a clockwise direction while lifting the domed enclosure.

To enhance the flow of air into the interior of the domed enclosure and over the engine 32, two projections 172 and 174 are located one on either side of latch 160. These projections 172 and 174 are located such that the lower edge 165 of the domed enclosure will engage the upper surfaces of those projections and hold the dome in spaced relationship above the lower deck. This provides an airspace under the lower edge of the dome shaped enclosure to allow airflow into the domed enclosure. In addition, by placing projections one on either side of the latch mechanism, a stable surface is provided against which the latch can operate. It should also be noted that projections 172 and 174 have an upper end which is slotted so that the edge 165 can be received therein for added stability.

To further accommodate the airflow, tabs 176 are provided on opposite sides of the domed enclosure. One tab 176 is shown in the drawings. An identical tab directly opposite to that tab is provided on the opposite side of the dome enclosure but is not shown in the drawings. The tab 176 engages a rim 178 which is provided around the mower deck and generally corresponds to the shape of the lower edge 165 of the domed enclosure. the tab 176 holds the lower edge of the domed enclosure above the ridge 178 again creating an airspace 174 to provide for airflow into the dome enclosure and over the engine.

It will be appreciated that the location of tab 176 can be either on the dome cover or on the mower deck, and the projections 172 and 174 can be on the dome cover as well.

Figure 5:
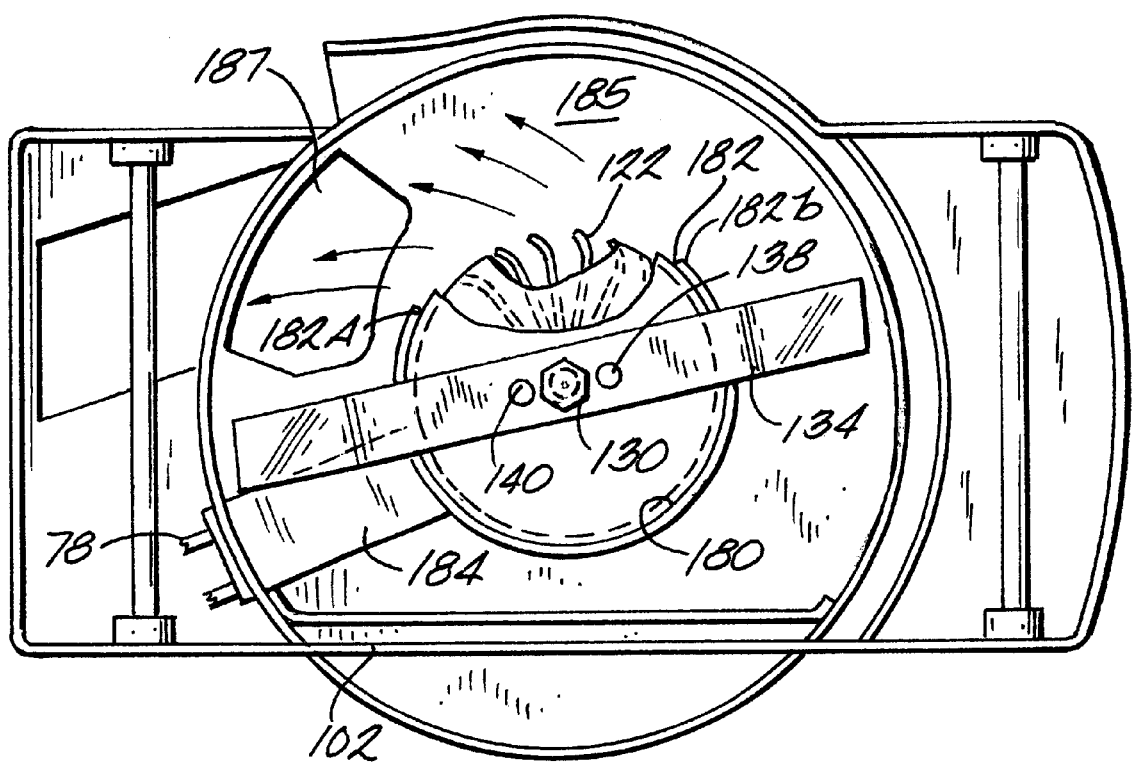
FIG. 5 is a bottom view of the lawnmower fan and its associated venting in relationship to the air discharge from the cutting chamber to the lawnmower bag.

With reference to FIG. 5, which is a view from the underside of the mower. Fan 122 can be seen as being housed in a circular compartment 180 such that the air drawn into the dome enclosure and over the engine is drawn into the circular enclosure 180. Enclosure 180 is substantially closed to the underside of the mower deck. It has a restricted opening into the cutter blade area 185. One side of the enclosure is provided with an opening 182, otherwise the wall of the circular enclosure is continuous. Opening 182 communicates with the discharge passage 187 through which the grass cuttings are directed by the mower blade to the rear bagger. The opening 182 is positioned such that a cord of the circular compartment 180, which includes the opposite ends 182a and 182b of opening 182, is generally parallel to the direction in which grass clippings flow into discharge passage 187. With this arrangement, airflow out of compartment 180 is generally tangential to the periphery of compartment 180 and can be readily entrained with the flow of clippings. The flow of grass clippings is also generally tangential to the enclosure 180 as it enters discharge passage 187. This adds to the force directing the clippings through the discharge passage.

The airflow being drawn through the mower assembly by fan 122 will be discharged through opening 182 generally in a tangential direction relative to chamber 180 and generally in alignment with the direction of grass cutting discharge airflow through the discharge passage 187. This is illustrated by the arrows in FIG. 5. This enhances airflow through the discharge passage for better discharge of grass cuttings. Also as can be seen in FIG. 2, the belt 78 is covered by an enclosure 184 to protect it from dirt, debris, etc. which is flowing through the mower in that area.

What is claimed is:

1. A lawnmower comprising, in combination,
   a mower deck having an upper side and an under side, and including a generally planar midportion terminating in a skirt portion, said skirt portion extending around the periphery of and depending from ad midportion, such that sad mower deck is generally U-shaped in cross-section,
   an internal combustion engine supported on said mower deck and positioned on the upper side thereof,
   a cutting blade connected to and driven by said engine, said cutting blade located on the underside of said mower deck,
   a dome shaped cover pivotally connected to said mower deck and positioned over and enclosing said engine, said cover being pivotable to alternately enclose and expose said engine,
   said cover having a lower marginal edge which, when said cover is enclosing said engine, is located in opposed relation to said mower deck in the area in which said deck midportion merges with said skirt portion, said skirt portion is generally co-planar with said lower marginal edge and is in depending relation relative to said cover as well as said deck midportion,
   vent means including vent openings adjacent said marginal edge and spaced around said cover for allowing air to enter said dome shaped cover, and
   fan means connected to and driven by said engine for producing, in cooperation with said vent means, air flow into and through said dome shaped cover to cool said engine.

2. The lawnmower of claim 1 including an aperture in said deck and wherein said engine is positioned at said aperture on the upper side of said deck, and said fan means is positioned at said aperture on the under side of said deck, whereby the air flow into and through said dome shaped cover is over said engine.

3. The lawnmower of claim 2 including a grass cuttings discharge opening in the under side of said deck and wherein said fan means is located in an enclosure which is substantially closed to the underside of said deck except through a restricted opening which is generally aligned with said grass cuttings discharge opening so that air exiting said enclosure is directed toward said grass cuttings discharge opening in the general path of grass cuttings flowing to said discharge opening.

4. The lawnmower of claim 3 wherein said dome shaped cover is generally elliptical.

5. The lawnmower of claim 4, wherein said vent means includes a plurality of vents, and wherein said vents are positioned, in relation to mower travel on opposite sides and at the rear of said dome shaped cover.

6. The lawnmower of claim 5 wherein said dome shaped cover includes an edge which faces the upper side of the mower deck when said dome shaped cover is positioned to enclose said engine, and
   tab means integrally formed with said cover and positioned between said deck and said cover edge whereby said edge of said cover is spaced above said deck to provide an opening through which air is allowed to pass into the interior of said cover under the influence of said fan means.

7. The lawnmower of claim 6 including
   a latch mechanism located at the front of said dome shaped cover and selectively engageable with said deck for holding said cover in its position covering said engine, and
   wherein two of said tabs are positioned one on each side of said latch mechanism.

8. A lawnmower comprising, in combination,
   a mower deck having an upper side and an under side, and including a generally planar midportion terminating in a skirt portion, said skirt portion extending around the periphery of and depending from said midportion, such that said mower deck is generally U-shaped in cross-section,
   an internal combustion engine supported on said mower deck and positioned on the upper side thereof,
   a cutting blade connected to and driven by said engine, said cutting blade located on the underside of said mower deck,
   a dome shaped cover pivotally connected to said mower deck and positioned over and enclosing said engine, said cover being pivotable to alternately enclose and expose said engine,
   said cover having a lower marginal edge which, when said cover is enclosing said engine, is located in opposed relation to said mower deck in the area in which said deck midportion merges with said skirt portion, said skirt portion is generally co-planar with said lower marginal edge and is in depending relation relative to said cover as well as said deck midportion,
   vent means including vent openings adjacent said marginal edge and spaced around said cover for allowing air to enter said dome shaped cover, fan means connected to and driven by said engine for producing, in cooperation with said vent means, air flow into and through said dome shaped cover to cool said engine, an aperture in said deck and wherein said engine is positioned at said aperture on the upper side of said deck, and said fan means is positioned at said aperture on the under side of said deck, whereby the air flow into and through said dome shaped cover is over said engine, a grass cuttings discharge opening in the under side of said deck and wherein said fan means is located in an enclosure which is substantially closed to the underside of said deck except through a restricted opening which is generally aligned with said grass cuttings discharge opening so that air exiting said enclosure is directed toward said grass cuttings discharge opening in the general path of grass cuttings flowing to said discharge opening, wherein said dome shaped cover is generally elliptical, wherein said vent means includes a plurality of vents, and wherein said vents are positioned, in relation to mower travel on opposite sides and at the rear of said dome shaped cover, wherein said dome shaped cover includes an edge which faces the upper side of the mower deck when said dome shaped cover is positioned to enclose said engine, tab means integrally formed with said cover and positioned between said deck and said cover edge whereby said edge of said cover is spaced above said deck to provide an opening through which air is allowed to pass into the interior of said cover under the influence of said fan means, a latch mechanism located at the front of said dome shaped cover and selectively engageable with said deck for holding said cover in its position covering said engine, wherein two of said tabs are positioned one on each side of said latch mechanism, and wherein said engine includes an exhaust and wherein one of said side vents is positioned in alignment with said exhaust, and said one side vent includes a defined opening in said cover, a plate receivable in said defined opening, and means engageable between said opening and said plate for releasably holding said plate in said opening.

* * * * *